June 3, 1924.

E. H. VINCENT

STEERING WHEEL

Filed Jan. 22, 1921

1,496,501

2 Sheets-Sheet 1

INVENTOR.
Edward H. Vincent,
BY
Edward N. Pagelsen,
ATTORNEY.

June 3, 1924.

E. H. VINCENT

STEERING WHEEL

Filed Jan. 22, 1921

1,496,501

2 Sheets-Sheet 2

Edward H. Vincent
INVENTOR.

BY

Edward N. Pagelsen
ATTORNEY.

Patented June 3, 1924.

1,496,501

UNITED STATES PATENT OFFICE.

EDWARD H. VINCENT, OF DETROIT, MICHIGAN.

STEERING WHEEL.

Application filed January 22, 1921. Serial No. 439,088.

*To all whom it may concern:*

Be it known that I, EDWARD H. VINCENT, a citizen of the United States, and residing at Detroit, in the county of Wayne and State of Michigan, have invented a new and Improved Steering Wheel, of which the following is a specification.

This invention relates to steering wheels for motor vehicles and its object is to provide a wheel which may be permitted to turn freely on the steering shaft or be attached thereto and in which the rim may be tilted relative to the steering shaft while the wheel is free to turn thereon.

This invention consists, in connection with a notched collar adapted to fit the upper end of the steering shaft and a nut to hold it in position, of a cross head adapted to rotate on the collar and having alined tapering sockets in its ends, a wheel rim, spider arms attached to the rim and having tapering trunnions extending into said sockets, a locking bolt mounted in the cross head in alinement with the trunnion sockets and adapted to engage the notches in the collar, a lock barrel slidable in one of the trunnions and a knob attached to the lock and adapted to draw it and the locking bolt outwardly, and locking pins mounted extending from the knob adjacent the lock barrel and slidable in the spider arm and adapted to enter holes in the adjacent end of the cross head to prevent the rim from tilting.

This invention also consists of means movable from operative to inoperative positions which controls the rotation of the steering shaft and the tilting of the rim, and a key operated lock adapted to secure said means in inoperative position, and a device to move said means from operative to inoperative position independent of the operation of the key.

It further comprises a collar on the steering rod provided with beveled shoulders at its upper and lower ends, the cross head fitting over the collar and having an annular beveled surface to engage the upper beveled shoulder of the collar, and a locking ring inserted in the lower end of the recess in the cross head and having a beveled surface to fit the beveled lower shoulder of said collar.

It also comprises a locking ring with notches in its upper edge and in a locking screw engaging one of the notches to keep the ring from being turned, access to the locking screw being prevented by the locking bolt.

It also consists in the details of construction illustrated in the accompanying drawings and particularly pointed out in the claims.

Figure 1:
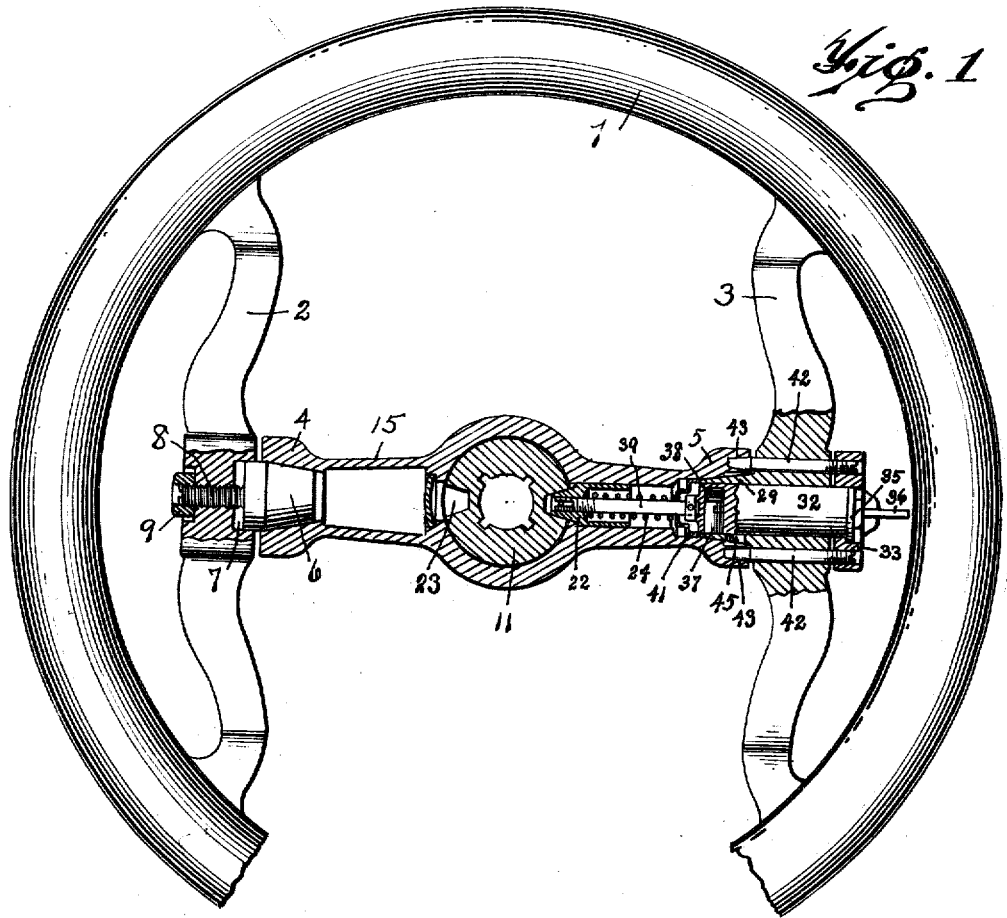
Figure 2:
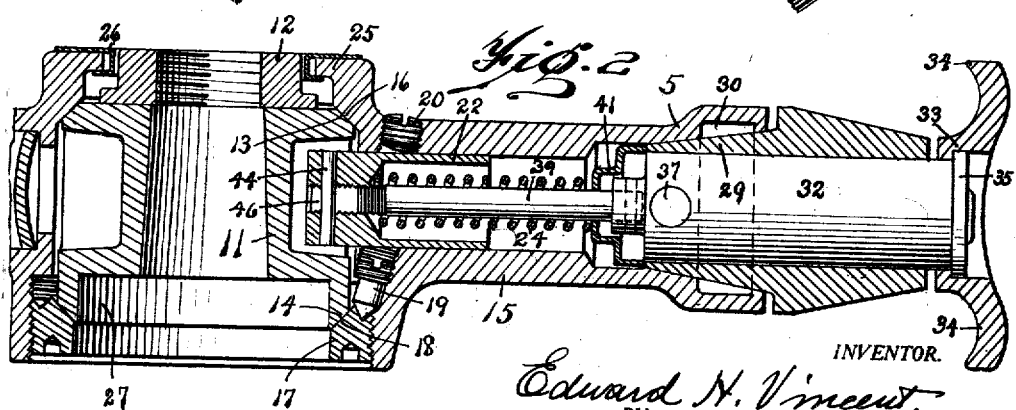
Figure 3:
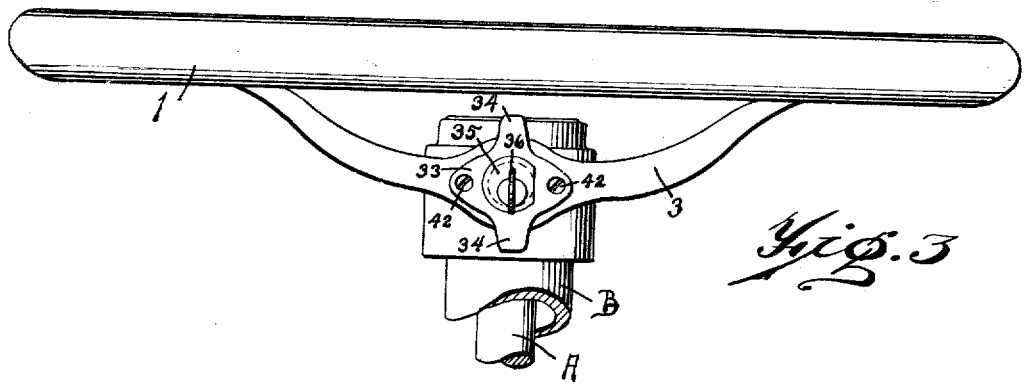
Figure 4:
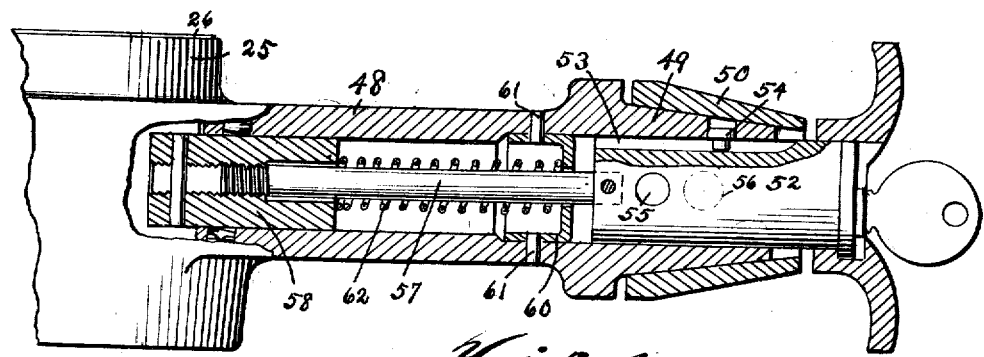
Figure 5:
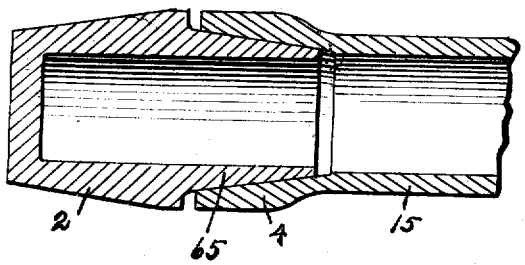

In the drawings, Fig. 1 is a plan of a steering wheel rim and a horizontal section of the cross head and the parts co-operating therewith. Fig. 2 is a vertical central section of one side of the cross head and of the collar on which the wheel is mounted. Fig. 3 is an elevation of the wheel. Fig. 4 is a section similar to Fig. 2 of a modified form of locking device. Fig. 5 is a detail of a trunnion.

Similar reference characters refer to like parts throughout the several views.

The steering wheel shown in the drawings is of the type shown and described in my pending application Serial Number 338,582, filed November 17, 1919.

To the rim 1 of the wheel shown in the drawings are attached the spider arms 2 and 3 in any desired manner. A cross head 15 extends between these arms and has tapering sockets 4 and 5 to receive the trunnions on the spider arms. In Fig. 1 the trunnion 6 is slidable in the socket 7 in the arm 2 and the stem 8 attached thereto is screw-threaded in the arm 2 so that the trunnion 6 may be adjusted to take up wear. A jamb nut 9 locks the trunnion from turning relative to the arm 2.

A collar 11 is adapted to be attached to the steering rod A by the nut 12 and this collar is preferably formed with beveled shoulders 13 and 14. The cross head 15 has a central recess to receive the collar 11 and a beveled surface 16 to slidably engage the shoulder 13. A locking ring 17 screws up into the central opening in the cross head and has a beveled surface 18 to engage the shoulder 14 on the collar. When the parts are positioned, the locking ring is secured by the screw 19 which enters one of the small notches in the upper rim of the ring and thus prevents the ring being turned. The upper end of the hole through which this screw 19 is inserted may be closed by the plug 20 and until this screw 19 is released the ring 17 cannot be removed.

The wheel is adapted to be locked to turn the collar and steering rod by a bolt 22 which is forced into a notch 23 by a spring 24. When this bolt is withdrawn, as hereinafter described, the wheel cannot turn the steering rod. In order to prevent wedges being driven into the space between the flange 25 at the top of the cross head and the nut 12, I spin a ring 26 of sheet metal around inside of this flange so that when a wedge is driven in between this ring and the nut 12, the flange 25 will slide around on this ring 26 without turning the nut. The steering column B extends up into the enlargement 27 of the bore of the collar 11 above the locking ring 17 so that there is no possibility of locking the cross head to the steering shaft by driving wedges between the ring 17 and steering column.

On the spider arm 3 is a trunnion 29 which extends into the socket 5 in that end of the cross head, which socket is formed with a circumferential groove 30. A well known lock barrel 32 is slidable in this trunnion and to its outer end is secured a knob 33 having two wings 34 so that it may be grasped by the fingers and drawn outwardly. A flange 35 on the lock barrel is mounted in this knob and is cut away at one side as shown in Fig. 3 to prevent the lock from turning in the knob. The key 36 is inserted into the end of the barrel in the usual manner and is adapted to draw inwardly the lock bolt 37 which is forced outwardly by the spring 38.

A stem 39 extends from the lock barrel to the locking bolt 22 and the spring 24 engages the cup-shaped washer 41 whose outer edge rests against the inner end of the trunnion 29. Two locking pins 42 are attached at their outer ends to the knob 33 and are adapted to enter tapering sockets 43 in the end of the cross head 15 adjacent the socket 5. The inner end of the stem 39 is screw-threaded in the locking bolt 22 and is prevented from turning by the pin 44 which extends through a slot 46 in this stem.

When the parts are as shown in Figs. 2 and 4, the rim cannot be tilted and the collar 11 turns with the wheel. When the knob 33 is pulled out until the bolt 37 of the lock 32 registers with the groove 30, this bolt 37 is forced out into this groove through the opening 45 in the trunnion by the spring 38 and prevents the knob 33, the locking pins 42 and the locking bolt 22 from returning to normal position. It is evident that the lock may be pulled outward by the knob 33 whether the key is in the lock or not, or the lock may be pulled out by the key. In such case, the wheel is free to rotate on the collar 11 and the rim to tilt on its trunnions. It is necessary to insert the key 36 in the lock barrel and turn it to draw in the bolt 37 before the spring 24 can again move inwardly and hold the locking bolt 22 and the parts connected thereto in the position shown in Figs. 1, 2 and 4.

When it is desired to remove the steering wheel, the plug 20 is removed, the key 36 is inserted and the lock barrel 32, stem 39 and bolt 22 are withdrawn until a tool may be inserted to turn back the locking screw 19, whereupon the ring 17 may be unscrewed and the wheel lifted from the collar 11.

In Fig. 4 I have shown a modified form of this locking device. The cross head 48 is formed with a trunnion 49 which engages in the socket 50 on the spider arm. The lock barrel 52 has a longitudinal groove 53 into which a short pin 54 extends to prevent this lock barrel from turning. The bolt 55 of the lock 52 is adapted to enter a hole in the trunnion which is indicated by the dotted circle 56 when the lock barrel, the stem 57 attached to the lock barrel and the locking bolt 58 attached to this stem are drawn outward. The lock may be pulled outward by the knob whether the key is in the lock or not, or the lock may be pulled out by the key as above described. A washer 60 secured by the pins 61 acts as an abutment for the compression spring 62. The action of this device is substantially the same as that above described.

In Fig. 5 I have shown a socket 4 into which extends a trunnion 65 integral with the spider arm 2 which may be substituted for the trunnion 6 shown in Fig. 1.

Other changes of the various parts may be made by those skilled in the art without departing from the spirit of my invention as set forth in the following claims.

I claim:—

1. In a steering wheel, a collar adapted to be secured to the steering shaft of an automobile, a rim for the steering wheel, a cross-head pivotally secured to said rim and to said collar, and means for positively locking said cross head to said collar and said rim, said rim being provided with alined sockets and said cross-head having alined trunnions fitting in said sockets.

2. In a steering wheel, the combination of a collar adapted to be secured to the steering shaft and having a recess in its lower end adapted to receive the steering column, a cross-head having a central chamber so it may fit over said collar, a locking ring secured into the lower end of said chamber in engagement with said collar to hold the cross-head in position, said cross-head being formed with alined tapering trunnions at its ends, a steering rim and spider arms attached thereto, said spider arms having tapering sockets to receive said trunnions, a locking barrel mounted in one of said trunnions and slidable radially relative to said collar, a stem attached to said lock barrel, a lock bolt on the inner end of said stem adapted to enter a notch in said collar, a spring on said stem to force said locking bolt inwardly into said notch, the end of the cross-head adjacent said lock being formed with holes, pins slidable in the adjacent spider arm adapted to enter said holes to prevent the rim from tilting on the cross-head, and a knob attached to said lock barrel and to said pins whereby said pins may be withdrawn from said holes in the end of the cross-head to permit the rim to be tilted and to withdraw the locking bolt from said notch to permit the spider to rotate freely on said collar.

3. In a steering wheel, a rim and spider arms attached thereto, a cross head having pivotal engagement with the spider arms through tapering trunnions and sockets to receive the trunnions, a notched collar secured on the steering shaft and on which the cross head is rotatably mounted, a locking bolt mounted in the cross head and adapted to enter a notch in the collar to cause the steering shaft to turn with the wheel, a lock barrel slidably mounted in one of the trunnions radially of the steering shaft, and means connecting the lock barrel to the locking bolt.

4. In combination with a rotatable steering shaft, a wheel head mounted thereon, a wheel structure movably mounted on said head, movable means adapted when in one position to allow rotation of said shaft by said wheel and prevent movement of the wheel structure on the head and when in another position to prevent rotation of said shaft by said wheel and allow movement of the wheel structure on the head, a key operated lock embodying key-controlled means adapted to lock said first mentioned means in one of the said positions, said first mentioned means being movable to the last stated position independent of the operation of the key.

5. In combination with a rotatable steering shaft, a wheel head mounted thereon, a wheel structure tiltably mounted on said head, movable members adapted when in one position to allow rotation of said shaft by said wheel and prevent tilting of the wheel structure on the head and when in another position to prevent rotation of said shaft by said wheel and allow movement of the wheel structure on the head, a key-operated lock embodying key-controlled means adapted to lock said movable members in one of the said positions, said members being movable to the last stated position independent of the operation of the key.

6. In combination with a rotatable steering shaft, a wheel head mounted thereon, a wheel structure movable on said head, a slidable key operated lock and members adapted to slide therewith, said slidable members adapted when in one position to allow rotation of said shaft by said wheel and prevent movement of the wheel structure on the head and when in another position to prevent rotation of said shaft by said wheel and allow movement of the wheel structure on the head, said key operated lock embodying key controlled means adapted to lock said slidable members and lock in one of the said positions, said slidable members and lock being slidable to the last stated position independent of the operation of the key.

EDWARD H. VINCENT.